(12) United States Patent
Dorfman et al.

(10) Patent No.: US 8,618,688 B2
(45) Date of Patent: Dec. 31, 2013

(54) WIND TURBINE CONFIGURATION WITH POWER CABLE AND METHOD OF ELECTRICALLY CONNECTING A GENERATOR OF A WIND TURBINE TO A TRANSFORMER

(75) Inventors: Robert Dorfman, Miami, FL (US); Norman Russell, Mt. Pleasant, SC (US); M. Shawn Foss, Katy, TX (US); Won Bae Jeon, Anyang (KR); Michael Dorfman, Hallandale, FL (US); Joshua Dorfman, Chicago, IL (US)

(73) Assignee: American Wire Group Inc., Hallandale Beach, FL (US)

( * ) Notice: Subject to any disclaimer, the term of this patent is extended or adjusted under 35 U.S.C. 154(b) by 458 days.

(21) Appl. No.: 12/829,111

(22) Filed: Jul. 1, 2010

(65) Prior Publication Data

US 2011/0187116 A1    Aug. 4, 2011

Related U.S. Application Data

(60) Provisional application No. 61/299,540, filed on Jan. 29, 2010.

(51) Int. Cl.
*F03D 9/00* (2006.01)
*H02P 9/04* (2006.01)

(52) U.S. Cl.
USPC .......................................................... 290/55

(58) Field of Classification Search
USPC .................. 290/55, 44; 174/90, 128.1, 128.2, 174/126.1, 113 R, 120 C, 27, 110 R
See application file for complete search history.

(56) References Cited

U.S. PATENT DOCUMENTS

| | | | |
|---|---|---|---|
| 3,571,490 A | 3/1971 | Bunish et al. | |
| 3,692,924 A | 9/1972 | Nye | |
| 3,823,255 A | 7/1974 | La Gase et al. | |
| 4,096,346 A | 6/1978 | Stine et al. | |
| 5,515,603 A | 5/1996 | Ziemek et al. | |
| 7,166,802 B2 | 1/2007 | Cusson et al. | |
| 7,199,485 B2 * | 4/2007 | Wobben | 290/55 |
| 7,717,673 B2 * | 5/2010 | Menke | 416/1 |
| 2006/0254801 A1 | 11/2006 | Stevens | |
| 2007/0013193 A1 * | 1/2007 | Galloway et al. | 290/44 |

FOREIGN PATENT DOCUMENTS

| | | |
|---|---|---|
| CN | 2924731 Y | 7/2007 |
| CN | 201348892 Y | 11/2009 |

* cited by examiner

*Primary Examiner* — Javaid Nasri
(74) *Attorney, Agent, or Firm* — Laurence A. Greenberg; Werner H. Stemer; Ralph E. Locher

(57) ABSTRACT

A wind turbine configuration is constructed with a power cable having an electrical conductor with a plurality of copper clad aluminum strands that are highly flexible. The power cable includes a composite insulator including an insulating material surrounding the electrical conductor and a jacket surrounding the insulating material. The wind turbine configuration includes a wind turbine having a tower with a top and a bottom. A generator is located near the top of the tower, and a transformer is located outside of the wind turbine. A plurality of rotor blades is connected to the generator. The power cable electrically connects the generator of the wind turbine to the transformer. A method includes electrically connecting the power cable to a generator of the wind turbine and to a transformer conveying power supplied by the generator to a switchyard.

17 Claims, 2 Drawing Sheets

WIND TURBINE CONFIGURATION WITH POWER CABLE AND METHOD OF ELECTRICALLY CONNECTING A GENERATOR OF A WIND TURBINE TO A TRANSFORMER

CROSS-REFERENCE TO RELATED APPLICATION

This application claims the benefit under 35 U.S.C. §119 (e) of my provisional application No. 61/299,540 filed Jan. 29, 2010. As far as possible under the rules, the prior application is herewith entirely incorporated by reference.

BACKGROUND OF THE INVENTION

1. Field of the Invention

The invention relates to a wind turbine configuration with a power cable and to a method of electrically connecting a generator of a wind turbine to a transformer used to convey power supplied by the generator.

2. Description of the Related Art

A power cable is installed in the tower of a wind turbine to electrically connect the generator, which is located near the top of the tower of the wind turbine, to a transformer, which is located near the bottom of the tower of the wind turbine. Generators, which are commonly used in wind turbines, typically output a voltage of at least 690 Volts. Accordingly, the mentioned power cable must be rated to safely carry at least 690 volts. However, it has become customary to use a power cable that is rated for a voltage of 2000 Volts.

BRIEF SUMMARY OF THE INVENTION

It is an object of the invention to provide a low cost power cable that has a flexibility enabling the power cable to be easily installed in a variety of different types of installations without a burdensome amount of effort that would result in a high installation cost.

It is an object of the invention to provide a low cost power cable that has a flexibility enabling the power cable to be easily installed in the tower of a wind turbine in order to electrically connect the generator, which is located near the top of the tower of the wind turbine, to a transformer, which is typically located outside of the wind turbine. The flexibility should be sufficient to enable the power cable to be easily installed in the tower without a burdensome amount of effort that would result in a high installation cost.

It is an object of the invention to provide a low cost power cable that meets all the electrical specifications required to electrically connect the generator of a wind turbine to the transformer that is used to supply power from the generator to the switchyard that carries power away from the wind turbine.

It is an object of the invention to provide a wind turbine with the power cable installed in the tower to electrically connect the generator to the transformer.

With the foregoing and other objects in view there is provided, in accordance with the invention, a wind turbine configuration including a wind turbine. The wind turbine includes a tower having a top and a base, a generator located near the top of the tower, and a plurality of rotor blades connected to the generator. The wind turbine configuration also includes a transformer that is preferably located outside of the wind turbine and a power cable that electrically connects the generator to the transformer. The power cable has a flexible electrical conductor with a plurality of copper clad aluminum strands. The power cable also has a composite insulator with an insulating material surrounding the electrical conductor and a jacket surrounding the insulation. The power cable is disposed at least partly in the tower and preferably extends to a location of the transformer that is external from the tower. The transformer is used to supply power from the generator to the switchyard that carries power away from the wind turbine.

In accordance with an added feature of the invention, the jacket of the power cable is made of chlorinated polyethylene or chlorosulfonated polyethylene.

In accordance with an additional feature of the invention, the insulating material of the power cable is made of ethylene propylene rubber.

In accordance with an added feature of the invention, the insulating material of the power cable is made of ethylene propylene rubber and the jacket of the power cable is made of chlorinated polyethylene or chlorosulfonated polyethylene.

In accordance with another feature of the invention, the plurality of copper clad aluminum strands are grouped and bunched.

In accordance with a further feature of the invention, a separator is disposed between the electrical conductor and the insulating material.

In accordance with a further added feature of the invention, the electrical conductor, the insulating material, and the jacket are constructed to provide a voltage rating of at least 2000 volts.

In accordance with another added feature of the invention, the electrical conductor, the insulating material, and the jacket are constructed to at least meet all of the following specifications: ICEA S-95-658, UL44; ASTM B-566, ASTM B-172, CSA FT-4, IEEE 383, and IEEE 1202.

In accordance with a further added feature of the invention, the electrical conductor, the insulating material, and the jacket are constructed to continuously operate at a temperature of 90° C. or 105° C. in wet or dry locations. The operating temperature is insured independently of the type of device(s) used to carry the power cable. The power cable could be disposed in trays (1/0 AWG and larger), conduits, underground ducts, direct buried circuits and/or aerial circuits.

In accordance with another further added feature of the invention, the electrical conductor is run in a tray or a conduit.

In accordance with another added feature of the invention, the insulating material has a minimum average thickness of 55 to 90 mils, and the jacket has a minimum average thickness of 30 to 65 mils.

With the foregoing and other objects in view there is also provided, in accordance with the invention, a method of electrically connecting a generator of a wind turbine to a transformer. The method includes a step of providing a power cable with a flexible electrical conductor including a plurality of copper clad aluminum strands, and a composite insulator including an insulating material surrounding the electrical conductor and a jacket surrounding the insulation. The method also includes a step of installing the power cable in a wind turbine. The method additionally includes a step of electrically connecting the power cable to a generator of the wind turbine and to a transformer used to convey power supplied by the generator to a switchyard.

Other features which are considered as characteristic for the invention are set forth in the appended claims.

Although the invention is illustrated and described herein as embodied in a wind turbine configuration with a power cable and in a method of electrically connecting a generator of a wind turbine to a transformer, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS OF THE INVENTION

Figure 1:
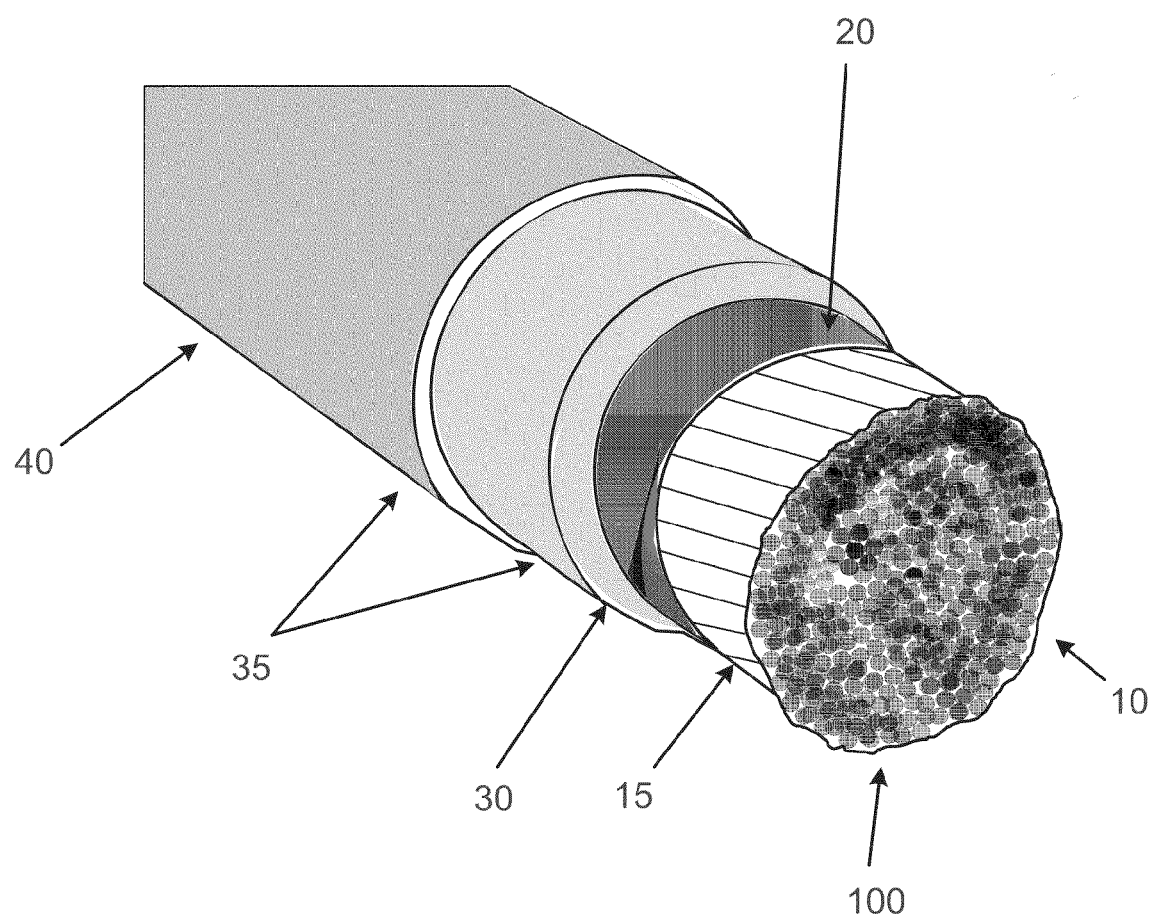
FIG. 1 is a schematic diagram of an exemplary embodiment of a power cable.

Referring now to the figures of the drawing in detail and first, particularly to FIG. 1 thereof, there is shown an exemplary embodiment of a single conductor power cable 100. For illustrative purposes, various portions of the components are shown stripped away so that all of the underlying components of the power cable 100 can be clearly seen. The electrical conductor 15 is constructed to be extremely flexible by using a plurality of copper clad aluminum strands 10 that are made with 10% to 15% copper. The copper clad aluminum strands 10 could be any gauge from 22 AWG through 40 AWG and the invention should not necessarily be construed as being limited to any particular gauge. However, the preferred option of obtaining the desired flexibility is to: use size 22 AWG for each one of the copper clad aluminum strands 10, and to select the number of copper clad aluminum strands 10 such that the size of the electrical conductor 15 that is formed by the copper clad aluminum strands 10 is from 6 AWG to 1000 kcmil. The plurality of copper clad aluminum strands 10 of the electrical conductor 15 of the power cable 100 are preferably stranded in accordance with ASTM B-566 and ASTM B-172. The plurality of copper clad aluminum strands 10 preferably meet the electrical resistance requirements of ICEA S-95-658. The size of each one of the plurality of copper clad aluminum strands 10 is preferably 22 AWG in order to comply with UL standards. Although not absolutely necessary, it is preferred that each one of the plurality of copper clad aluminum strands 10 has the same size.

Table I, which appears below, is a bunching and stranding chart for constructing electrical conductors 15 of various sizes using 22 AWG strands which have an outer diameter (OD) of 0.0253 inches. The column labeled as "Stranding" shows the bunching and grouping for various sizes of electrical conductors 15 made from the plurality of 22 AWG copper clad aluminum strands 10.

TABLE I

| Conductor Size | Stranding | # of Strands | Conductor Diameter | Weight #/MFT |
| --- | --- | --- | --- | --- |
| 6 | 41/.0253 | 41 | 0.186 | 32.7 |
| 4 | 65/.0253 | 65 | 0.235 | 51.8 |
| 3 | 7 × 12/.0253 | 84 | 0.293 | 67.3 |
| 1/0 | 7 × 24/.0253 | 168 | 0.415 | 134.6 |
| 2/0 | 7 × 30/.0253 | 210 | 0.464 | 168.2 |
| 3/0 | 7 × 37/.0253 | 259 | 0.515 | 207.5 |
| 4/0 | 7 × 47/.0253 | 329 | 0.580 | 263.6 |
| 250 | 19 × 21/.0253 | 399 | 0.647 | 321.2 |
| 350 | 19 × 29/.0253 | 551 | 0.760 | 443.6 |
| 500 | 19 × 41/.0253 | 779 | 0.904 | 627.1 |
| 600 | 37 × 25/.0253 | 925 | 0.988 | 748.3 |
| 750 | 37 × 32/.0253 | 1184 | 1.118 | 957.8 |
| 800 | 37 × 34/.0253 | 1258 | 1.128 | 1017.5 |
| 900 | 37 × 38/.0253 | 1406 | 1.218 | 1137.4 |
| 1000 | 37 × 42/.0253 | 1554 | 1.280 | 1257.1 |

The power cable 100 includes a flexible composite insulator 35 with an insulating material 30 surrounding the electrical conductor 15 and a flexible jacket 40 surrounding the insulating material 30. The power cable 100 preferably includes a separator 20 disposed between the electrical conductor 15 and the insulating material 30. The jacket 40 is a tough heat, flame, and oil resistant thermosetting jacket. The jacket 40 is preferably made of chlorinated polyethylene (CPE) or chlorosulfonated polyethylene (CSPE). The insulating material 30 is made of a flexible thermosetting dielectric material, which can be, for example, ethylene propylene rubber (EPR) or a material based on an ethylene propylene type elastomer. Of course, the invention should not necessarily be construed as being limited to the described materials for the jacket 40 and the insulating material 30, since these preferred materials are merely given as examples. The electrical conductor 15, the insulating material 30, and the jacket 40 can be constructed to provide a voltage rating of at least 690 volts. However, the electrical conductor 15, the insulating material 30, and the jacket 40 are preferably constructed to provide a voltage rating of at least 2000 volts. The electrical conductor 15, the insulating material 30, and the jacket 40 are preferably constructed to continuously operate at a temperature of 90° C. or 105° C. in wet or dry locations, whether in trays (1/0 AWG and larger), conduits, underground ducts, direct buried circuits or aerial circuits. The electrical conductor 15, the insulating material 30, and the jacket 40 are specifically constructed to meet or exceed at least some, and preferably to meet or exceed all of the requirement of all of the following specifications: ICEA S-95-658, UL44; ASTM B-566, ASTM B-172, CSA FT-4, IEEE 383, and IEEE 1202. All of the specifications ICEA S-95-658, UL44; ASTM B-566, ASTM B-172, CSA FT-4, IEEE 383, and IEEE 1202 are herein fully incorporated by reference.

The jacket 40 may alternatively be a low smoke, halogen free jacket and the insulating material 30 may alternatively be constructed from cross-linked polyolefin insulation. However, this construction does not provide as much flexibility as the other described materials. Therefore, using a low smoke, halogen free jacket and cross-linked polyolefin insulation may not be suitable when a high degree of flexibility is desired.

The exemplary embodiment of the single conductor power cable 100 is preferably constructed to meet or exceed the requirements of all of the following specifications: ICEA S-95-658, UL44; ASTM B-566, ASTM B-172, CSA FT-4, IEEE 383, and IEEE 1202. As previously mentioned, the jacket 40 of the exemplary embodiment of the single conductor power cable 100 is preferably made of chlorosulfonated polyethylene (CSPE) or chlorinated polyethylene (CPE).

The exemplary embodiment of the single conductor power cable 100 is preferably also UL listed and is preferably type RHH RHW-2 VW-1 2000V. The electrical conductor 15 is made of a plurality of 22 AWG copper clad aluminum strands 10. The number of copper clad aluminum strands 10 is chosen such that the size of the electrical conductor 15 formed by the copper clad aluminum conductors 10 is from 6 AWG to 1000 kcmil.

Table II lists the requirements on the thickness of the insulating material 30, when it is made of ethylene propylene rubber (EPR), and lists the requirements on the thickness of the jacket 40, when it is made of chlorosulfonated polyethylene (CSPE) or chlorinated polyethylene (CPE), for sizes of the electrical conductor 15 ranging from 6-2 AWG to 550-1000 kcmil.

TABLE II

| Circuit Voltage (AC or DC) | Conductor Size (AWG/ kcmil) | Minimum Average Thickness (mils) | | 5 Min. AC Withstand (kV) |
|---|---|---|---|---|
| | | EPR | CPE or CSPE | |
| 2000 | 6-2 | 55 | 30 | 7.0 |
| | 1/0-4/0 | 65 | 45 | 8.0 |
| | 250-500 | 75 | 65 | 9.5 |
| | 550-1000 | 90 | 65 | 11.5 |

The single conductor power cable 100 will preferably undergo certain production tests. The composite insulator 35 must be tested to withstand a high AC voltage test. The last column in table II lists the voltage that the single conductor power cable 100 must withstand for 5 minutes after being submerged in water for six hours. The insulation resistance constant is also tested to insure that it is not less than 20,000 megohms-1000 ft. at 15.6° C.

The single conductor power cable 100 will also preferably undergo the following flame test procedures:

(1) UL 44 vertical flame test;
(2) IEEE 1202-1991—#1/0 AWG & larger;
(3) IEEE 383-1974 & ICEA T-30-520; and
(4) ICEA T-29-520 (210,000 BTU/hr.)—#1/0 AWG & larger.

Figure 2:
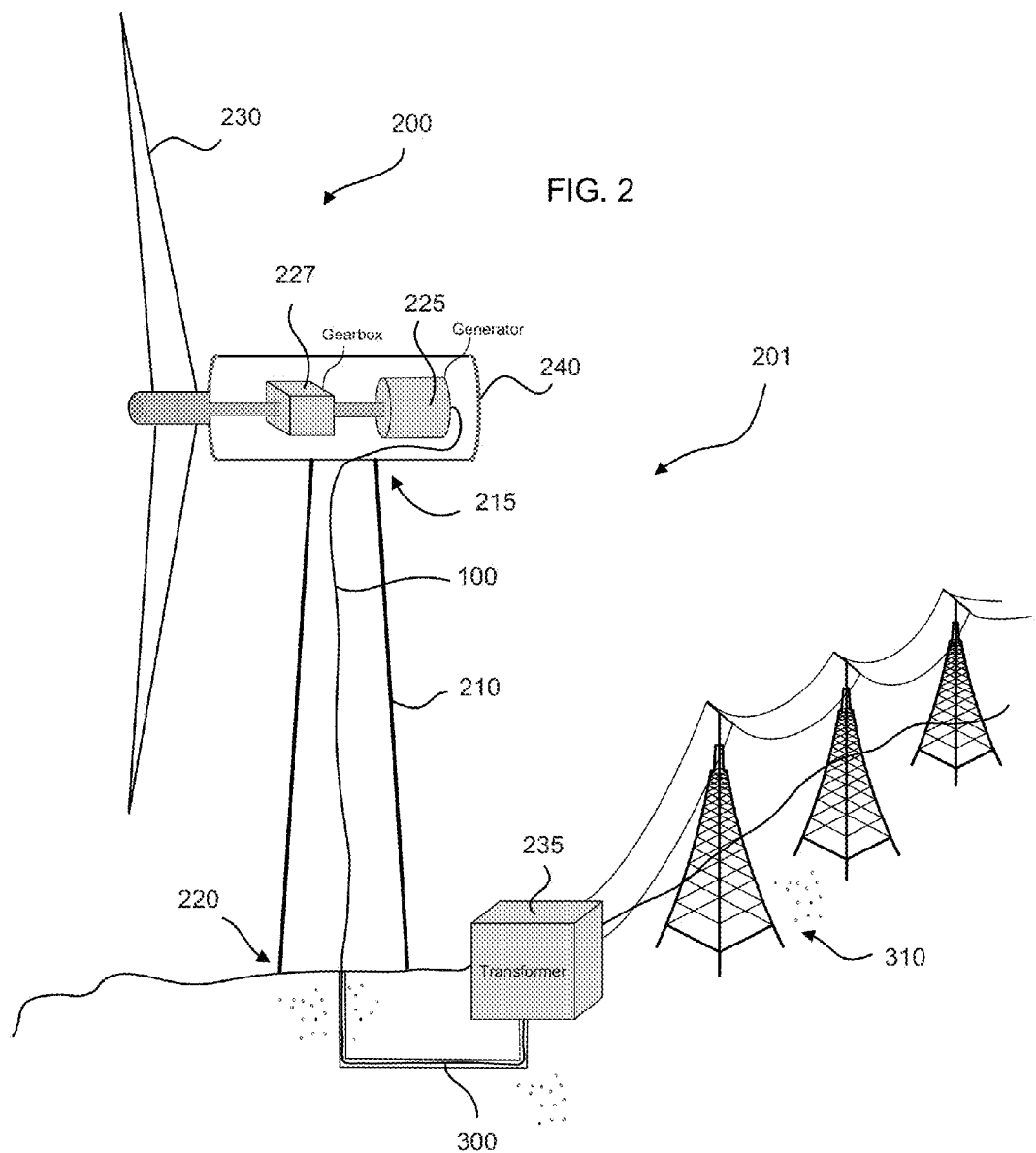
FIG. 2 is a schematic diagram of an exemplary embodiment of a wind turbine.

Referring now to FIG. 2, there is shown a schematic diagram of an exemplary embodiment of a wind turbine configuration 201 that includes a wind turbine 200 and a transformer 235 that is preferably located outside of the wind turbine 200. The wind turbine 200 includes a tower 210 having a top 215 and a base 220. The height of the tower is typically 80 feet. However, the tower could have any height desired. The wind turbine 200 includes a nacelle 240 located near the top 215 of the tower 210. The nacelle 240 houses a generator 225 and a gear box 227. A plurality of rotor blades 230 is connected to the generator 225 via the gearbox 227. Since the generator 225 is housed in the nacelle 240, the generator 225 is located near the top 215 of the tower 210. It is necessary to electrically connect the generator 225, which is located near the top 215 of the tower 210, to a transformer 235, which is typically located on the ground at a location spaced away from the base 220 of the tower 210. The actual location of the transformer 235 with respect to the base 220 of the tower 210 depends on the topography of the area where the tower 210 is located. However, it is desirable to position the transformer 235 as close to the base 220 of the tower 210 as possible. The transformer 235 conveys power supplied by the generator 225 to a switchyard 310 that carries power away from the wind turbine 200.

The power cable 100 that has been described above is used to electrically connect the generator 225 to the transformer 235. The flexibility of the power cable 100 allows one or more workers to expend much less effort when installing the power cable 100 in the tower 210 than if a more rigid cable was used. Thus the installation cost is minimized or at least reduced compared to the installation cost when using a more rigid cable. The copper clad conductors 10 (See FIG. 1) of the power cable 100 result in a significant material cost savings compared to the cost of a power having copper conductors.

The power cable 100 is preferably hung on supports located in the nacelle 240 and in the tower 210 and is run from the nacelle 240 into the top 215 of the tower 210, through the tower 210, and out of the base 220 of the tower 210. The power cable 100 is also run through an electrical conduit 300 that extends from the base 220 of the tower 210 to the transformer 235. The power cable 100 is electrically connected to the generator 225 and to the transformer 235. Safe operation and a long lifetime of the power cable 100 are insured since the power cable 100 is constructed to continuously operate at a temperature of at least 90° C. and preferably 105° C. in wet or dry conditions.

We claim:

1. A wind turbine configuration, comprising:
   a wind turbine including a tower having a top and a base, a generator located near said top of said tower, a plurality of rotor blades connected to said generator;
   a transformer located near said base of said tower; and
   a power cable including:
   a flexible electrical conductor including a plurality of copper clad aluminum strands, and
   a composite insulator including an insulating material surrounding said electrical conductor and a jacket surrounding said insulation;
   said power cable electrically connecting said generator to said transformer; and
   said power cable disposed at least partly in said tower and extending out of said base of said tower to said transformer.

2. The wind turbine configuration according to claim 1, wherein said jacket of said power cable is made of chlorinated polyethylene.

3. The wind turbine configuration according to claim 1, wherein said insulating material of said power cable is made of ethylene propylene rubber.

4. The wind turbine configuration according to claim 1, wherein said insulating material of said power cable is made of ethylene propylene rubber and said jacket of said power cable is made of chlorinated polyethylene or chlorosulfonated polyethylene.

5. The wind turbine configuration according to claim 1, wherein said plurality of copper clad aluminum strands of said power cable are grouped and bunched.

6. The wind turbine configuration according to claim 1, wherein said power cable includes a separator disposed between said electrical conductor and said insulating material.

7. The wind turbine configuration according to claim 1, wherein said electrical conductor, said insulating material, and said jacket are constructed to provide a voltage rating of at least 2000 volts.

8. The wind turbine configuration according to claim 1, wherein said electrical conductor, said insulating material, and said jacket of said power cable are constructed to at least meet all of a plurality of specifications in the group consisting of:
   ICEA S-95-658;
   UL44;
   ASTM B-566;
   ASTM B-172;
   IEEE 383; and
   IEEE 1202.

9. The wind turbine configuration according to claim 1, wherein said electrical conductor, said insulating material, and said jacket of said power cable are constructed to continuously operate at a temperature of 90° C. or 105° C. in wet or dry locations.

10. The wind turbine configuration according to claim 9, further comprising:
an electrical conduit extending from said base of said tower to said transformer;
said power cable disposed in said electrical conduit.

11. The wind turbine configuration according to claim 1, wherein said insulating material of said power cable has a minimum average thickness of 55 to 90 mils, and said jacket of said power cable has a minimum average thickness of 30 to 65 mils.

12. The wind turbine configuration according to claim 1, wherein said transformer is located outside of said wind turbine.

13. A method of electrically connecting a generator of a wind turbine to a transformer, which comprises:
providing a power cable with a flexible electrical conductor including a plurality of copper clad aluminum strands, and a composite insulator including an insulating material surrounding the electrical conductor and a jacket surrounding the insulation;
installing the power cable in a wind turbine; and
electrically connecting the power cable to a generator of the wind turbine and to a transformer conveying power supplied by the generator to a switchyard;
wherein the transformer is located near a base of a tower of the wind turbine, and the power cable extends out of the base of the tower to the transformer.

14. The method according to claim 13, which comprises: making the jacket of the power cable of chlorinated polyethylene.

15. The method according to claim 13, which comprises: making the insulating material of the power cable of ethylene propylene rubber.

16. The method according to claim 13, which comprises: making the insulating material of the power cable of ethylene propylene rubber and making the jacket of the power cable of chlorinated polyethylene or chlorosulfonated polyethylene.

17. The method according to claim 13, which comprises: constructing the electrical conductor, the insulating material, and the jacket of the power cable to at least meet all of a plurality of specifications in the group consisting of:
ICEA S-95-658;
UL44;
ASTM B-566;
ASTM B-172;
IEEE 383; and
IEEE 1202.

* * * * *